Dec. 23, 1969 M. J. HOLUBAR 3,485,107

TAPE DRIVE

Filed Oct. 24, 1968 2 Sheets-Sheet 1

INVENTOR.
MELVIN J. HOLUBAR

BY Warren H. Kintzinger
ATTORNEY

Dec. 23, 1969 M. J. HOLUBAR 3,485,107

TAPE DRIVE

Filed Oct. 24, 1968 2 Sheets-Sheet 2

INVENTOR.
MELVIN J. HOLUBAR
BY
Warren H. Kintzinger
ATTORNEY

United States Patent Office 3,485,107

Patented Dec. 23, 1969

3,485,107

TAPE DRIVE

Melvin J. Holubar, Marion, Iowa, assignor to Collins Radio Company, Cedar Rapids, Iowa, a corporation of Iowa Filed Oct. 24, 1968, Ser. No. 770,208
Int. Cl. F16h *15/14, 13/10*
U.S. Cl. 74—190 14 Claims

ABSTRACT OF THE DISCLOSURE

A two-speed shiftable tape drive with a floating idler wheel mounting yoke with transfer wheel self-centering in a record and playback drive position speed setting and also in a fast forward drive position speed setting.

This invention relates in general to tape drives, and in particular, to a two-speed shiftable tape drive with a floating idler wheel mounting yoke for transfer wheel self-centering for each respective drive position speed setting.

Various problems are encountered in providing tape drives, particularly for endless tapes, in carrying the tape in travel through simultaneous erase, record and playback, and particularly when two speeds of record and normal play speed and a fast forward speed are desired, for example, 1⅞" per second and 15" per second, respectively, and with a suitable reliable drive shift system provided for the desired shifting from one speed to the other. Further, with many such systems, tolerance problems have been multiplied and many of the existing drive systems are quite complicated and expensive.

It is, therefore, a principal object of this invention to provide a two speed shiftable tape drive, shiftable between a normal record and playback lower speed to a fast forward higher speed and with transfer wheels being self-centering for each respective drive position speed setting.

A further object with such a tape drive is the provision for a floating mount for the two respective speed transfer idler wheel structures with the yoke floating a nominal distance and with, thereby, no close tolerances being required between the drive shaft and the capstan and also with respect to the transfer wheel structures themselves.

A further object is for the idler transfer wheel in the fast forward mode of operation to contribute some self energization while in its drive position due to the rotational direction of the drive wheel.

Still a further object is to provide a spring loaded cam actuator advantageously maintaining a constant force on the transfer idler wheel for the record mode of operation.

Features of this invention useful in accomplishing the above objects include, a drive motor and its shaft with a two diameter drive roller mounted thereon in predetermined fixed spacing relative to the parallel rotatably mounted shaft extension of the capstan tape drive roller. A two speed idler wheel floating yoke mounted shiftable assembly is provided with a shift lever having an extension biased by a tension spring for cam position setting against a multisurface cam device mounted in the structure and having two cam surfaces for resilient spring reaction there against for caming engagement of idler wheels into both drive position settings, and with the cam device having a neutral position for idler wheel disengagement from drive in either of the drive speeds. A somewhat stronger tension spring is provided for floating movement of the idler drive wheel through a limited resiliently biased range of movement permitted by a limited float mounting of the idler drive wheel assembly in providing desired engagement of the idler assemblies as each is shifted into its drive position against its respective diameter roller drive portion of the two diameter drive roller mounted on the drive motor shaft.

A specific embodiment representing what is presently regarded as the best mode for carrying out the invention is illustrated in the accompanying drawings.

Figure 1:
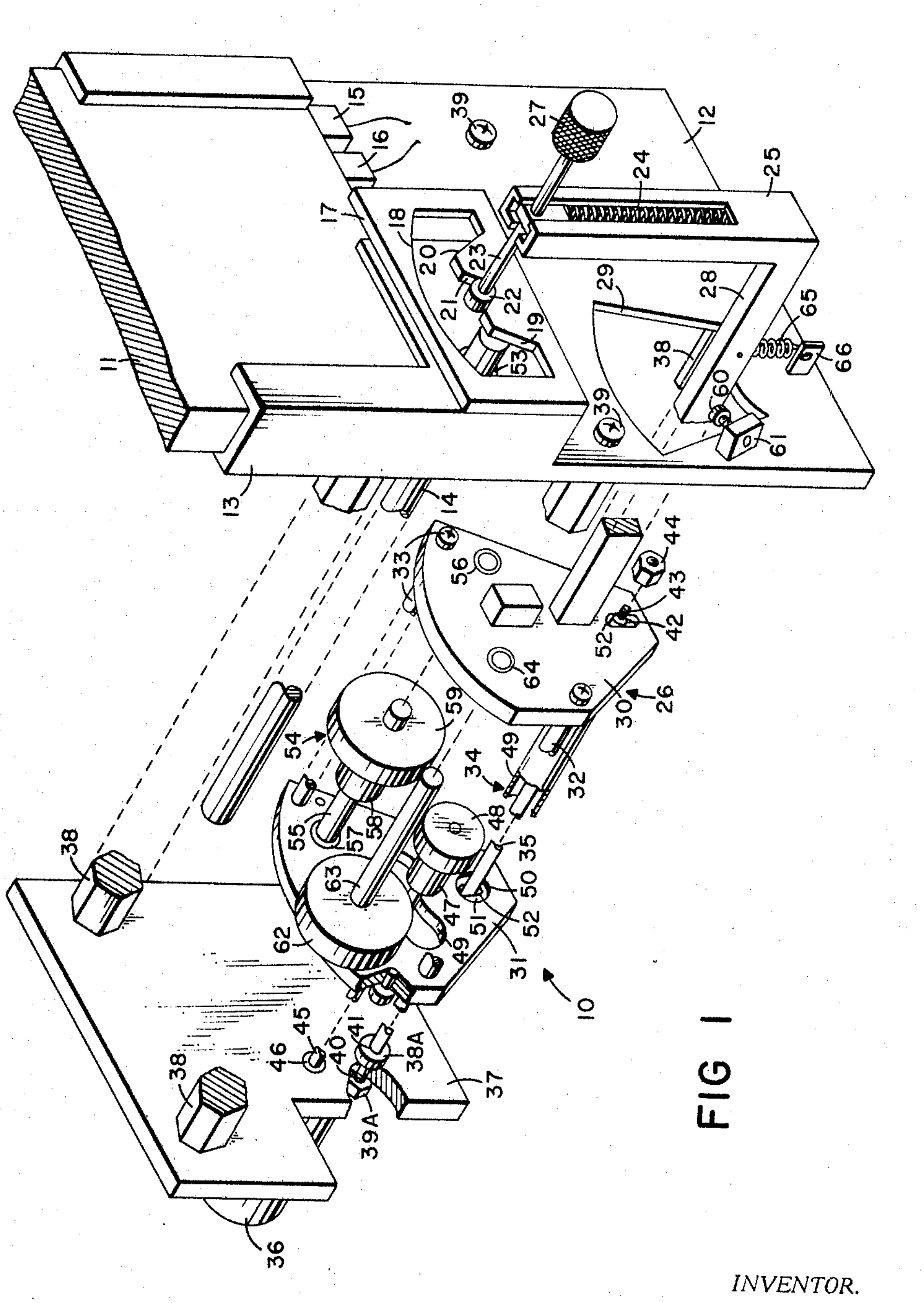
FIGURE 1 represents a partially exploded and partially removed detailed view of applicant's two speed tape drive as related to its setting in and for selected two speed shifted, or neutral position setting relative to a two roller diameter capstan drive for an endless tape cartridge mounted in a record, erase, and playback tape system.

Referring to the drawings:

Applicant's floating yoke and idler wheel two speed drive system 10 is shown to be mounted on a tape cartridge 11, mounting table 12, with the bulk of the two speed drive system mounted on one side of the tape table 12 opposite from the side receiving and mounting the tape cartridge 11 which is received in a channel pocket structure 13 of the mounting table 12. The tape cartridge in form of an endless tape cartridge 11 is inserted in place in the cartridge receiving pocket of tape table 12 to an inserted position where the tape is brought into engagement bearing against the capstan drive shaft 14 and with the tape running by record and playback heads 15 and 16 in a conventional manner known to those skilled in the art. At the bottom end and above the tape cartridge receiving pocket structure 13, a cam plate 17 is mounted with a cam portion equipped and clearance opening 18 therein. The cam portion of opening 18 includes a fast forward drive engaging cam surface 19, traversely to the other side a relatively low record and playback tape drive speed cam positioning drive engaging cam reactive surface 20, and also an intermediate drive disengagement neutral position holding notch 21. Notch 21 receives shift position retaining cam roller 22 rotatably mounted on a shifting shaft 23 of the shifting assembly with the roller 22 being rollable against the cam surfaces 18 and 19 as urged via resilient force exerted by spring 24 mounted in a shift extension member 25 of floating drive yoke carriage 26 along with the cam roller 22 and shifting shaft 23 extending from shift knob 27. This structure advantageously provides for side reactive force derived from the tension of spring 24, as exerted through roller 21 in rolling engagement against the cam surfaces 19 or 20, to shift the position of the shift drive assembly 10 to one side or the other in engaging the drive in one speed setting or the other. The shift extension member 25 has a shift moveable extension 28 which extends through accurate clearance opening 29 provided through tape table 12 in order to provide clearance through the full shifted range shift range movement of the shift member 25 and the extension 28 thereof extending to and fixed, as by conventional means, detail not shown, on yoke plate 30. Shifting drive yoke plate 30 is connected in aligned spaced relation to a like opposite end parallel spaced shifting yoke plate 31 by interlinking structural bolt, or like members 32 and 33 along with interlinking rotatably mounted shafts and a combined floating yoke assembly mounting pin and spaced floating tube structure 34.

The mounting pin and spaced floating tube structure 34 for mounting of the floating yoke assembly 26 includes a pin 35 mounted in a fixed position on motor 36 mounting plate 37. The plate 37 is in turn mounted in fixed spaced parallel relation to the tape cartridge mounting table 12 by structural pillars 38, locked in place to the table 12 and motor mounting plate 37, respectively, as by pillar mounting screws 39. The yoke assembly mounting pin 35 is fixed to the motor mounting plate 37 with spacing shoulder 38*a* tightened against the yoke side of plate 37 by bolt nut 39*a* tightened on threaded extension 40 at the reverse side of plate 37. The expanded diameter spacing shoulder 38 is provided with a bearing surface 41 against which plate 31 may rest in relatively moveable supported bearing contact. The extended shank of mounting pin 35 terminates toward the other end thereof in a shoulder 42, having a smaller diameter threaded extension 43 therefrom in order that a nut 44 may be tightened down snugly against the shoulder 42 in order that a bearing surface be provided by the radially outwardly extended portions of the nut 44, or a washer restrained under the nut 44 against shoulder 42, if desired, for the outer surface of yoke plate 30 at that location. This is with the spacing between shoulder 42 and shoulder surface 41 of the mounting pin 35 being such as to provide for support of the yoke assembly 26 and easy, readily rotatable shift movement thereof therebetween in the two speed drive system 10. A tape drive shaft 45 extends from drive motor 36 through support bearing 46 in motor mounting plate 37 to the lower speed record and playback speed diameter drive wheel shoulder 47, and also to thereabove, or beyond a relatively more greatly increased diameter fast forward drive wheel 48. The drive shaft 45 mounting drive wheels 47 and 48 extends through elongated semi-arcuate clearance opening 49 that provides for floating movement of the yoke plate 31 and the yoke drive assembly 26 relative to the drive shaft 45 and the fixed position mounting members of the shift drive assembly 10.

Figure 2:
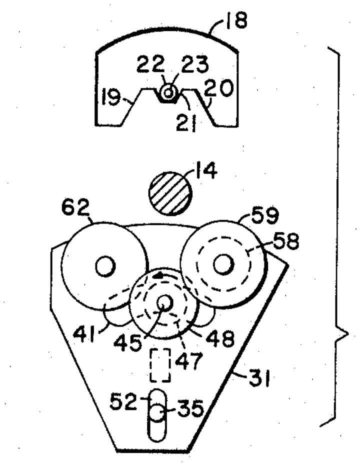
FIGURE 2 is a partial showing of the floating yoke and idler wheel two speed shiftable tape drive as positioned in the neutral drive setting position.
Figure 3:
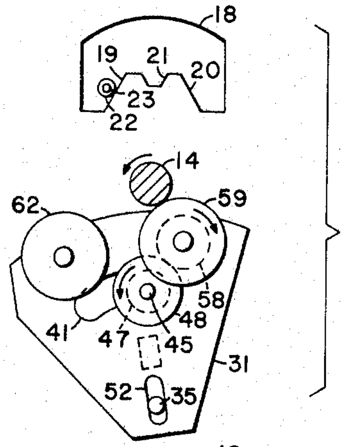
FIGURE 3 is a similar showing of the floating yoke and idler wheel assembly as shifted to the high speed drive state.
Figure 4:
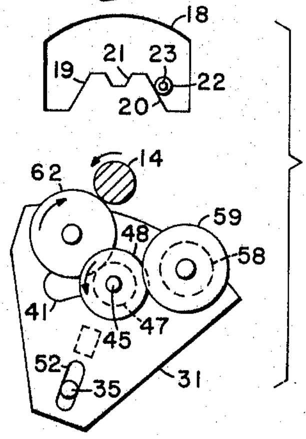
FIGURE 4 is the idler wheel and floating yoke assembly as shifted to the low speed capstan drive state.

With reference again to the combined floating yoke assembly mounting pin 35 and spaced floating tube structure 34, please note that a spacing tube 49 is provided that has ends received in circular recessed openings 50 provided in the inner facing sides of both of the shift yoke plates 30 and 31 in the form shown in yoke plate 31. The openings 50 are provided with shoulders 51 that help space the plates 30 and 31 via the tube 49, and with the spacing tube 49 also being in spaced relation to the shank of mounting pin 35, along with elongated openings 52 provided in the plates 30 and 31 providing for required limited relative floating movement of the shift yoke assembly 26. This floating movement is relative to fixed position mounting pin 35, fixed position drive shaft 45 and its drive wheels 47 and 48, and also with respect to the fixed position rotatably mounted capstan drive shaft 14. Capstan drive shaft 14 is rotatably mounted by bearing assembly 53 in tape table 12 in spaced parallel relation to the drive shaft 45 and the mounting pin 35. The drive shift yoke assembly 26 is equipped wtih a fast forward drive wheel assembly 54 mounted on rotatable shaft 55 rotatably mounted in bearing assemblies 56 and 57 of yoke plates 30 and 31, respectively, and with the fast forward drive wheel assembly 54 including a smaller diameter drive wheel 58 and a larger diameter drive wheel 59. When the shift yoke assembly 26 is shifted from the neutral state shown in FIGURE 2 with the cam roller 22 on shift shaft 23 lodged in the neutral groove 21 to the fast forward cam surface 19 set shifted position of FIGURE 3, the smaller diameter shift drive wheel 58 is brought into engagement with the larger diameter drive wheel 48 mounted on drive shaft 45 and the larger diameter shift drive wheel 59 is simultaneously brought into engagement with the capstan drive shaft 14. Please note that a self-energization factor is involved with this drive engagement since the motor drive wheel 48 is rotating in such direction as to partially draw the drive wheel assembly 45 into further engagement and also wheel 59 is driving the capstan drive shaft 14 in a direction of drive also tending to draw the assembly into more positive drive engagement. In view of this action force in addition to the reaction force translated from spring 24 to cam roller 22 from cam surface 19 in the resiliently urged shifted drive engagement provided thereby, an adjustable limit stub 60 is adjustably threaded into mount projection 61 of mounting table 12 to limit the engagement shift swing position of the shift extension member 25, and thereby, the floating drive yoke carriage assembly 26. A single drive shift wheel 62 rotatably mounted by shaft 63 via bearing assemblies 64 in the shift yoke plates 30 and 31 is shiftable with shifting of the yoke assembly 26 to be brought into record and playback speed drive engagement with the drive wheel 47 of motor drive shaft 45 and simultaneously the capstan drive shaft 14 when the yoke assembly 26 is shifted for cam roller engagement with cam surface 20 as shown in FIGURE 4.

Further, a tension spring 65 is connected in a conventional manner between shift member 25, extension 28, and projection 66 of mounting table 12, and with spring 65 being a stronger tension spring exerting stronger tension forces in the assembly than tension spring 24. These springs 24 and 65 are so chosen as to provide desired operational resilient spring reaction camming engagement of drive idler wheels into the drive engagement as shift selected and for floating movement of the idler drive wheel assembly in attaining a desired engagement of the respective idler wheels as sub-assemblies as each is shifted into its drive shifted position. While accommodating this floating action, the spring 65 insures proper idler drive wheel engagement with the respective drive wheel of drive shaft 45 when the drive yoke carriage assembly 26 is shifted into either low or high speed drives.

Thus, there is hereby provided a floating yoke and idler wheel assembly two speed tape drive with the transfer idler drive wheels being floated a nominal distance in a self-adjust action between the motor drive and the tape drive capstan. This is such that no close tolerances are required in the shiftable drive assembly and extensive drive wheel wear may be tolerated through an extended service life without adverse deterioration of operational performance. A self-energizing drive engagement factor for the fast forward drive setting is an advantageously helpful factor, and in the lower speed record and playback setting, the inherently substantially constant force engagement of the idler shift wheel in its drive engagement is a very favorable factor. This drive advantageously provides a record speed, for example, of 1⅞" per second with fluter under 1.7% without requiring flywheel drive stabilization and also a fast forward drive shifted speed of 15" per second.

Whereas this invention is here illustrated and described with respect to a single embodiment thereof, it should be realized that various changes may be made without departing from the essential contributions to the art made by the teachings hereof.

I claim:

1. In a two speed tape drive system, power drive means including a power drive shaft; a rotatably mounted tape capstan drive shaft; mounting of both of said shafts in, relatively, fixed spaced relation; a multiple transfer idler wheel drive assembly mounted in selectably shiftable relation to both of said shafts for alternate drive engagement of various said idler wheels; means mounting said idler wheel drive assembly with limited float permitting mount connections for self-drive contact adjustment between selected idler drive wheels in a shifted drive setting with said power drive shaft and said tape capstan drive shaft; first directional force means connected to impose directional force on said idler wheel drive assembly urging an idler wheel of a selected shifted speed setting into driven relation with said power drive shaft; cam means and cooperatively engaging camming shift means; and second directional force means connected to said idler wheel drive assembly and to said camming shift means for developing shifted setting idler wheel drive engagement maintaining reactive forces.

2. The two speed tape drive system of claim 1 wherein, said cam means includes two cam surfaces; said camming shift means includes a cam surface engaging and following device shiftable for selectably engaging one or the other of said two cam surfaces; said two cam surfaces being individually sloped for cam reaction directed engagement of an idler wheel drive shift selected.

3. The two speed tape drive system of claim 2 wherein, said cam means includes neutral setting means between said two cam surfaces.

4. The two speed tape drive system of claim 2 wherein, said multiple transfer idler wheel drive assembly includes a yoke structure rotatably mounting said multiple transfer idler wheels; and mounting means with a pivotal anchor pin structure mounting of said yoke structure for limited transverse shifting movement relative to said power drive shaft and said tape capstan drive shaft.

5. The two speed tape drive system of claim 4 wherein, elongate opening clearance is provided for said pivotal anchor pin structure to permit said limited float attainment of desired shifted idler wheel drive engagement.

6. The two speed tape drive system of claim 5 wherein, said camming shift means cam surface engaging and following device includes a cam roller mounted on carriage means in a shift member; with said second direction force means including a spring connected to said carriage means and to said shift member so as to exert unidirectional force on said carriage means and cam surface engaging force on said cam roller.

7. The two speed tape drive system of claim 6 wherein, said two cam surfaces are sloped to shift said yoke and the idler wheel drive assembly with cam roller reaction forces traversely one direction or the opposite for the shift selected drive engagement.

8. The two speed tape drive system of claim 7, wherein, a neutral shift setting notch is interposed between said two cam surfaces for retaining said cam roller when so shift positioned with said spring means resiliently maintain the cam roller in said neutral shift setting notch until shifting action is undertaken with shift manipulating means provided therefor.

9. The two speed tape drive system of claim 7 wherein, said first directional force means is spring means connected to said idler wheel assembly mounting yoke and to mounting means connected to said power drive means and said power drive shaft with resilient spring force exerted on said yoke and idler wheel assembly in a direction drawing an idler wheel shift drive selected into desired driving engagement with said power drive shaft.

10. The two speed tape drive system of claim 9 wherein, the resilient force of said first directional force means spring is of greater magnitude than the resilient force of said second directional force means spring.

11. The two speed tape drive system of claim 9 also including a shift drive engagement shift movement adjustable stop for limiting drive engagement movement of said idler wheel drive assembly and its mounting yoke in one of the shift drive directions of motion.

12. The two speed tape drive system of claim 9 wherein, said idler wheel drive assembly includes a single idler wheel shiftable into drive engagement with both said power drive shaft and said capstan tape drive shaft for a first speed drive.

13. The two speed tape drive system of claim 12 wherein, said idler wheel drive assembly also includes a compound two diameter wheel structure shiftable into drive engagement with a first wheel diameter periphery in engagement with said power drive shaft and a second wheel diameter periphery in drive engagement with said capstan tape drive shaft for a second speed drive.

14. The two speed tape drive system of claim 13 also including a compound two diameter drive wheel portion on said power drive shaft with one diameter periphery engageable with said single idler wheel for said first speed drive and the other diameter periphery engageable with the first wheel diameter periphery of said compound two diameter wheel structure of the idler wheel drive assembly for said second speed drive.

References Cited

UNITED STATES PATENTS

| | | | |
|---|---|---|---|
| 2,551,266 | 5/1951 | Hartman | 74—190 |
| 2,925,737 | 2/1960 | Hartman | 74—190 XR |
| 3,366,342 | 1/1968 | Nieland | 74—190 XR |

FRED C. MATTERN, JR., Primary Examiner

J. A. WONG, Assistant Examiner

U.S. Cl. X.R.

74—213